March 19, 1935.  A. HERVÉ  1,994,820
BRAKE
Filed Dec. 11, 1929   2 Sheets-Sheet 1
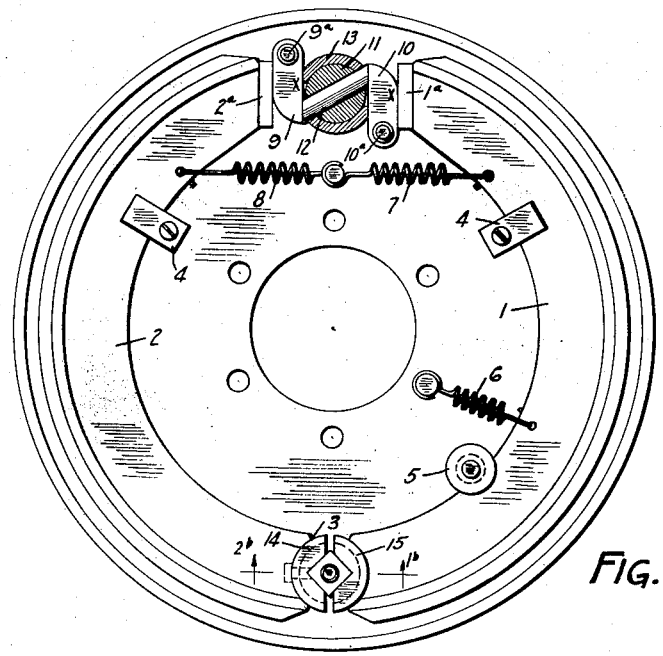
Fig.1
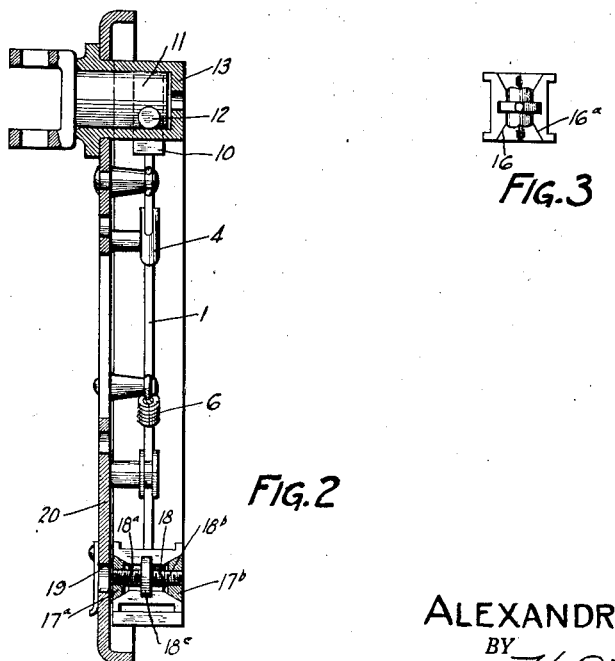
Fig.2
Fig.3
INVENTOR.
ALEXANDRE HERVÉ
BY H. Q. Clayton
ATTORNEY March 19, 1935.　　　A. HERVÉ　　　1,994,820
BRAKE
Filed Dec. 11, 1929　　2 Sheets-Sheet 2

INVENTOR.
ALEXANDRE HERVÉ
BY
ATTORNEY

Patented Mar. 19, 1935

1,994,820

UNITED STATES PATENT OFFICE 1,994,820

BRAKE

Alexandre Hervé, Clichy, France, assignor to Bendix Brake Company, Chicago, Ill., a corporation of Illinois Application December 11, 1929, Serial No. 413,158
In France February 27, 1929

15 Claims. (Cl. 188—78)

The present invention has for an object a brake particularly intended for automobiles and in which a feature comprises a cam which is not working directly on the brake shoes but through the intermediary of pivoted members or levers disposed symmetrically on each side of the cam.

According to one form of the invention, the cam is provided with a sliding part, the extremities of which may contact with two opposed pivoted members which are themselves in contact with the brake shoes.

The latter are mounted freely in the brake drum in such a manner as to permit floating of the shoes and wrapping action according to the direction of rotation of the drum, the operation being the same in forward or reverse action.

In another form of the invention, the cam rotates between the upper ends of two bell crank levers articulated in a manner similar to a pair of pliers, the inner ends of said levers being provided at their ends with bearing members which are in contact with the internal faces of the brake shoes. In their released position, the brake shoes are in abutment against two fixed stops on each side of the cam.

As in the first form of the invention, the shoe assembly is free to float in the drum to insure wrapping action in forward as well as in reverse operation.

Another feature of the invention, especially in the first form shown, consists in the adjusting mechanism to take up for wear, said mechanism being disposed at the articulating point of the shoes.

This adjusting mechanism comprises two half bearings on which are fitted each articulating end of the shoes in order to permit pivoting action of the shoes and in which the spreading of the shoes is done by means of wedges.

These wedges for example can be two conical nuts having right and left threads and disposed on a screw also having opposed threads in such a way that adjusting can be easily made from the exterior of the brake by turning said screw with a screw driver.

The description which will follow in connection with the annexed drawings, will make clear the manner in which the invention is worked out.

Figures 1 and 2 are views in longitudinal and transverse section of a form of the invention;

Figure 3 is a view in detail of one of the pieces of the adjusting mechanism.

Figure 4:
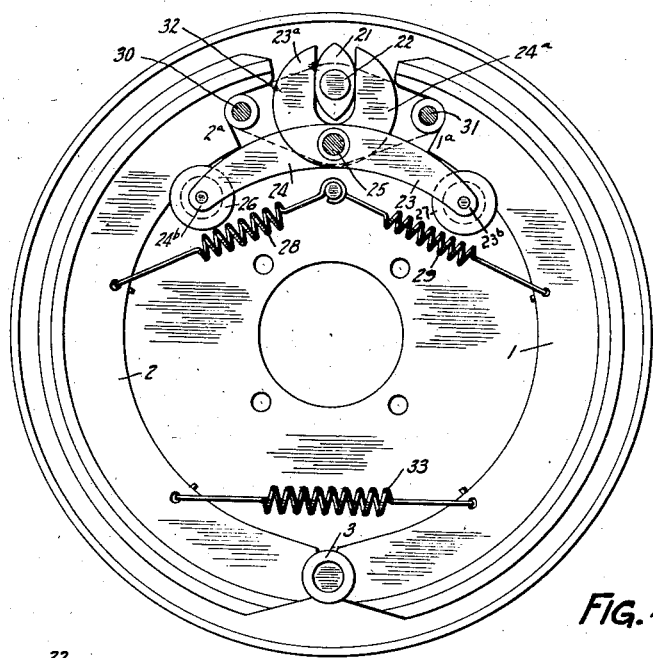
Figures 4 and 5 show an alternative form of the invention.

The brake represented in Figures 1 and 2 comprises two brake shoes 1 and 2 connected together by an articulating joint 3, the shoe assembly being disposed freely in the drum (which is not shown on the drawings) and, for example, centered in the following manner. The shoes are resting on guides 4 which hold the shoes against movement in a lateral direction and one of the shoes 1 is brought up against a cam 5 by the spring 6, the two shoes being held together by the springs 7 and 8.

The ends of the shoes $1^a$ and $2^a$ are in abutment against levers 9 and 10 pivoted at $9^a$ and $10^a$ and the spreading of said ends is realized by a cam formed by a shaft having a diametrically sliding part 12 sliding in the shaft 11, as shown in Figure 1. These pivoted levers 9 and 10 are disposed symmetrically with respect to the center of the cam.

Shaft 11 rotates in a fixed bearing 13, which also serves as an abutment for the pivoted levers 9 and 10. It will be seen that when the shaft 11 is rotated the sliding member 12 causes pivoted levers 9 and 10 to rotate about their pivots $9^a$ and $10^a$ to open the shoe ends until such time as the lining is in contact with the drum.

At this time the wrapping action of the floating shoe takes place in the usual manner by reason of the friction of the shoes against the drum according to the direction of rotation of said drum.

It will be seen that, due to the symmetrical disposition of the pivoted levers, the braking is obtained in a manner which will be exactly the same in forward as well as in reverse direction without danger of grabbing, the contact between the pivoted levers and the shoe ends $1^a$ and $2^a$ taking place in the diametrical plane axis of the cam.

It may be advantageous at the beginning of the braking action to make one of the shoe ends spread more than the other in such a manner that the contact with the drum will take place at only one of the shoe ends, for example, the end $1^a$. It is only necessary in this case to employ springs 7 and 8 of a different weight.

The brake which has just been described can advantageously comprise an apparatus for adjustment to take up for wear of the lining. This mechanism is constituted, for example, by two half bearings 14 and 15 on which are disposed the shoe ends $2^b$ and $1^b$, these half bearings having inclined faces on their internal ends as shown in 16 and $16^a$ against which are disposed the equally inclined faces of the nuts $17^a$ and $17^b$ of opposite inclination. These nuts are screwed on a threaded rod 18 having opposed threads 18ª and 18ᵇ and located in the two half bearings by a collar 18ᶜ. The opening 19 in the brake supporting plate 20 will allow the turning of the adjusting screw 18 by means of a screw driver which will spread or bring the shoe ends closer together according to the direction of rotation of the screw driver. We can thus regulate in a very precise manner the position of the brake shoes to take up for wear after a certain period of use.

Figure 5:
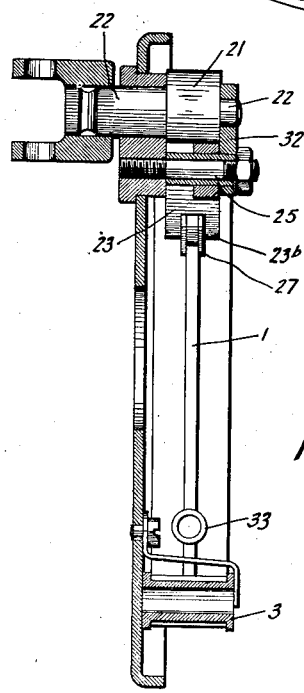

In the form shown in Figures 4 and 5 the cam 21 actuated by shaft 22 is disposed between the ends 23ª and 24ª of the bell crank levers 23 and 24 articulated at 25 in the diametrical plane of the brake passing through the axis of the cam. These bell crank levers are disposed similarly to a pair of pliers, as shown in Figure 4.

At 24ᵇ and 23ᵇ, the outer ends of the bell crank levers, are disposed rollers 26 and 27 which are in contact with the internal faces of the extremities 1ª and 2ª of the shoes 1 and 2 articulated at 3. In the released position said ends are returned against fixed abutments 30 and 31 by springs 28 and 29, said abutments 30 and 31 being united by a strap 32, thus insuring centering of the brake.

Close to the articulating joint 3 a spring 33 is provided to hold the shoes against the articulating joint 3. If the cam 21 is rotated, the ends 23 and 24 will be spread apart and will open the shoe ends through the intermediary of the rollers 26 and 27 until the shoes are in contact with the drum. At this point the floating shoes wrap themselves against the drum, due to the friction, in the usual manner.

By reason of this disposition of the bell crank levers 23 and 24, a very powerful braking action is obtained which is equal for forward as well as reverse operation.

As previously mentioned, springs having different weights can be used in such a manner that one or the other of the brake shoes may contact with the drum at the beginning of the brake application.

It is understood that modifications can be incorporated in the brake which has just been described without departing from the spirit and scope of the invention.

In particular the mechanism insuring the adjustment of the shoes for wear can be applied not only to the brake described with regard to Figures 1 to 3, but equally to any other form of brakes.

The brake shoes are united together by an articulating joint 3.

I claim:

1. A brake comprising friction means having adjacent separable ends, a cam between said ends, and a thrust lever pivoted radially inward of said cam and engaging one side of the cam at one end and engaging at its other end the shoe on the opposite side of the cam.

2. A brake comprising friction means having adjacent separable ends, a cam between said ends, and a pair of thrust levers embracing the cam between them and each pivoted radially inward of said cam and engaging one side of the cam at one end and engaging at its other end the shoe on the opposite side of the cam.

3. A brake comprising friction means having adjacent separable ends, a cam between said ends, and a thrust lever engaging one side of the cam at one end and engaging at its other end the shoe on the opposite side of the cam.

4. A brake comprising friction means having adjacent separable ends, a cam between said ends, and a pair of thrust levers embracing the cam between them and each engaging one side of the cam at one end and engaging at its other end the shoe on the opposite side of the cam.

5. A brake comprising a drum, friction means having adjacent separable ends and arranged to anchor at one of said ends when the drum is turning in one direction and at the other of said ends when the drum is turning in the other direction, a cam between said ends, and a thrust lever engaging one side of the cam at one end and engaging at its other end the shoe on the opposite side of the cam.

6. A brake comprising a drum, friction means having adjacent separable ends and arranged to anchor at one of said ends when the drum is turning in one direction and at the other of said ends when the drum is turning in the other direction, a cam between said ends, and a pair of thrust levers embracing the cam between them and each engaging one side of the cam at one end and engaging at its other end the shoe on the opposite side of the cam.

7. A brake comprising a cam, an anchor on each side of the cam, friction means having radial surfaces engaging said anchors, and a pair of levers each operatively engaging one side of the cam and a part of the friction means on the opposite side of the cam from its point of engagement therewith.

8. A brake comprising a cam, an anchor on each side of the cam, friction means having notches seating against said anchors, and a pair of levers each operatively engaging one side of the cam and a part of the friction means on the opposite side of the cam from its point of engagement therewith.

9. A brake comprising friction means, a cam, and a bellcrank lever thrust circumferentially by said cam and thrusting in a radial direction against the friction means.

10. A brake comprising friction means, a cam, and a pair of bellcrank levers thrust in opposite directions circumferentially by said cam and both thrusting in a radial direction against the friction means.

11. A brake applying device comprising a cam, a pivot adjacent the cam, and a pair of thrust levers pivoted on said pivot and embracing the cam between them and each extending operatively on the side of the cam opposite its point of engagement therewith.

12. A brake applying device comprising a cam, a pivot adjacent the cam, and a thrust lever pivoted on said pivot and engaging the cam and extending operatively on the side of the cam opposite its point of engagement therewith.

13. A brake comprising a drum, friction means anchoring at one end when the drum is turning in one direction and anchoring at the other end when the drum is turning in the other direction, and applying means pivotally mounted immediately adjacent said ends and in rolling engagement with and thrusting radially outward against the friction means adjacent both of said ends.

14. A brake comprising a drum, friction means having radially movable ends and anchoring at one of said ends when the drum is turning in one direction and anchoring at the other of said ends when the drum is turning in the other direction, and applying means fulcrumed immediately adjacent said ends and in rolling engagement with and thrusting radially outward against the friction means adjacent both of said ends.

15. A brake comprising a drum, friction means anchoring at one end when the drum is turning in one direction and anchoring at the other end when the drum is turning in the other direction, and applying levers fulcrumed immediately adjacent said ends and having thrust rollers engaging and thrusting radially outward against the friction means adjacent both of said ends.

ALEXANDRE HERVÉ.